United States Patent [19]

Dick

[11] Patent Number: 4,905,208
[45] Date of Patent: Feb. 27, 1990

[54] DISTANCE DETECTING APPARATUS

[75] Inventor: Norman R. Dick, Sooke, Canada

[73] Assignee: Interphase Technologies Inc., Richmond, Canada

[21] Appl. No.: 81,330

[22] Filed: Aug. 4, 1987

[51] Int. Cl.[4] .............................................. G01S 7/52
[52] U.S. Cl. ...................................... 367/99; 367/95; 367/101
[58] Field of Search ................. 367/127, 118, 124, 87, 367/88, 99, 98, 101, 107, 95, 97, 135, 137

[56]  References Cited
U.S. PATENT DOCUMENTS

| 4,221,004 | 9/1980 | Combs et al. | 364/114 |
| 4,376,990 | 3/1983 | Metcher | 367/95 |
| 4,420,824 | 12/1983 | Weber | 367/98 |
| 4,551,825 | 11/1985 | Biber | 367/101 |
| 4,597,069 | 6/1986 | Milano et al. | 367/95 |
| 4,712,200 | 12/1987 | Cassou | 367/88 |
| 4,779,243 | 10/1988 | West | 367/137 |

OTHER PUBLICATIONS

"Microprocessor-Based Interface of Oceanography...", NTIS Technical Note, Jul. 1981.

Primary Examiner—Thomas H. Tarcza
Assistant Examiner—Ian J. Lobo
Attorney, Agent, or Firm—Shlesinger & Myers

[57] ABSTRACT

A distance detecting apparatus has a transmitter for transmitting a cyclic output signal. The transmitter is digitally controlled to adjust the frequency of the output signal in relatively small increments through a band of frequencies. A receiver receives a cyclic reflected signal and has an adjustable center frequency of response. There is a device for adjusting the center frequency of response to correspond to the frequency of the output signal. The apparatus may have digital control for controlling the power level of the output signal. There may be a digital control for the gain of the receiver. The apparatus may also include a transducer for converting electrical signals to ultrasonic signals and include controls for adjusting the frequency of the output signal according to requirements of the transducer.

24 Claims, 4 Drawing Sheets

DISTANCE DETECTING APPARATUS

BACKGROUND OF THE INVENTION

The invention relates to distance detecting apparatuses and, in particular, to ultrasonic depth sounders, also known as sonars.

Various types of distance measuring apparatuses work on the principle of sending out a signal, and then measuring the time delay which occurs before a reflected signal is received back. The time interval is proportional to the distance between the point where the signal is transmitted and the object from which the signal is reflected. Ultrasonic depth sounders, typically used on sports or commercial fishing boats, are examples of such distance measuring devices. These basically include a transmitter for generating an electrical signal, a transducer for converting the electrical signal into an ultrasonic signal, for transmitting the ultrasonic signal into the water, and also for receiving the reflected ultrasonic signal and converting it back into an electrical signal. A receiver receives the return electrical signal from the transducer. There is a display device for converting the time delay into a readable form which indicates the depth from the transducer, typically in the bottom of the boat, to the fish, bottom or other objects below the boat.

Basically these devices measure the time it takes for a signal to return. Sound travels at a known rate in water with small variations, depending upon the salinity of the water, and so the depth is proportional to the time between the transmitted signal and the received echo. Clearly, therefore, some control is necessary of the transmit signal in order to permit calculation of the time and therefore the distance.

One of the earliest types of devices is still on sale, and is known as a "flasher". The flasher employs a rotating ring with contacts which trigger the transmit cycle once per revolution. A neon tube is mounted on the ring, and is fired by the amplified received echo. The distance the ring rotates from the transmit position before the neon is illuminated is proportional to the time between the transmit signal and the return of the echo and therefore is proportional to the depth. However, such devices can only indicate instantaneous depth.

Chart recording depth recorders are used to show a record or trend in the depth. A pen moves across a roll of paper and presses against the paper when an echo is received. The paper is then advanced and the cycle repeated.

A more recent development has been the use of a video display, either a cathode ray tube (CRT) or a liquid crystal display (LCD). These provide a record similar to a track recorder, except that the image is lost once the picture reaches the end of the screen.

Microprocessers have been used on depth sounders to make them easier to use and, with some signal processing, provide displays which are clear and easier to interpret.

As mentioned, the ultrasonic transducer converts the high frequency electrical signal into an ultrasonic signal which is transmitted into the water during the transmitting phase of operation of the depth sounder. The transmitting phase is followed by a receiving phase when the reflected ultrasonic signals reach the transducer again. The transducer then converts the ultrasonic echo back into electrical signals which are filtered, amplified and converted to a visual display as described above. Transducers are usually fitted into a permanent position in the bottom of a boat, and therefore are not easily removeable. A main unit housing the transmitter, receiver and display device is usually located at a convenient place on the boat and is connected to the transducer by a cable. If the main unit fails, or if the boat owner wishes to update the unit, he is faced with the problem of compatability between the main unit and the transducer, because not all transducers are the same.

Firstly, transducers differ as to their resonant frequency, that is the optimum frequency at which they convert electrical signals into ultrasonic signals. There is no optimum frequency for all conditions and thus, any particular frequency chosen is a compromise in design. Most depth sounders have a frequency of 25 KHz–200 KHz. Frequencies of 50 KHz–200 KHz are most common. The lower the frequency, the greater the possible depth from which an echo can be successfully recovered. On the other hand, the higher the frequency, the greater the potential resolution. Therefore, two basic systems are commonly employed, one around 50 KHz for maximum depth and one about 200 KHz for maximum detail. Depth sounders have been built which are convertible from one frequency to another by switching circuit cards having different components for each frequency. The main unit then must be connected to a transducer suited to that particular frequency. Some depth sounders may receive both frequencies simultaneously.

Transducers also vary in the beam angle, that is the manner in which the ultrasonic signal is propagated below the boat. point source transducers would provide acoustic energy radiating equally in all directions in a spherical manner. Cylindrical transducers produce a downwardly expanding cone with a point at the transducer. The strongest and clearest echos are received from objects within the cone, that is, within the beam area. Small transducers result in wide beam angles which cover the widest possible area, while larger transducers can produce narrower angles which cover less area, but produce stronger and sharper echos.

Transducers employ crystals which are generally cut in a way such that the optimum transmit frequency is not exactly the same as the optimum angle for receiving ultrasonic signals. Consequently, there is a frequency between the optimum transmit frequency and optimum receive frequency which produces the best overall results, and this frequency varies from sample to sample of the same type of transducer. Therefore manufacturers may provide the ability to vary the transmit and receive characteristics over a small range to allow tuning in the field to optimize the response for a particular transducer.

Transducers also vary as to the maximum power they can receive from the transmitter, and consequently convert into ultrasonic signals. Increasing power is required to produce a discernable signal over noise at increasing depths. Typically, for example, power of 100 watts RMS might suffice for 500 ft., while 600 watts RMS might be required at 1,000 ft. If too much power is fed to a particular transducer, then cavitation occurs, which dramatically reduces performance or even actual physical damage may occur in the form of fractured crystals. Consequently, it is desirable to provide power which is just below the maximum that a particular transducer can accommodate.

Since transducers are more permanent installations than the main unit or display unit on the boat, and in view of their varying characteristics discussed above, it is an object of this invention to provide transmitter, receiver and display components which are compatible with a wide range of transducers, so that a single unit or a combination of units incorporating these components can be used irrespective of the particular transducer. Economies result from the fact that only a single apparatus needs to be manufactured and stocked by retailers and wholesalers rather than a range of different components for different transducers.

It is also an object of the invention to provide transmitters and receivers capable of changing frequencies over a wide range without the necessity of changing components. The apparatus thus may be adapted for different conditions of the transducer or the environment by simple adjustments, or automatically under microprocesser control, without changing circuit boards and the like.

It is a further object of the invention to provide a transmitter portion for a depth sounding apparatus which has power output controllable to match a particular transducer. This adjustment should be automatic so that the efficiency of the depth sounding apparatus is maximized, without jeopardizing the transducer itself.

It is a further object of the invention to provide a receiver portion with a centre of frequency response which automatically and exactly corresponds with the frequency of the transmitter.

Another object of the invention is to provide a receiver portion with an adjustable band width such that the band width is increased for maximum resolution when noise level increases and is decreased when noise levels increase.

SUMMARY OF THE INVENTION

The invention provides a distance detecting apparatus such as a depth sounding apparatus, which includes a transmitter for periodically transmitting a cyclic output electrical current. A transducer is connected to the transmitter for converting the output electrical current to an output ultrasonic signal, for receiving a reflected ultrasonic signal, and for converting the reflected ultrasonic signal to an input electrical current. There is a receiver for receiving the input electrical current and means for converting the input electrical current to a readable form, indicating a distance at which the ultrasonic signal is reflected. There is digitally controlled means connected to the transmitter for adjusting the frequency of the output electrical current to a desired level.

There may also be means connected to the receiver for adjusting the centre response frequency of the receiver to correspond to the frequency of the output electrical signal. This may include a switched capacitor filter. The receiver may have means for digitally controlling receiver gain. This means may include a switched capacitor filter The apparatus may further include digitally controlled means connected to the transmitter for maintaining the power output of the transducer at a predetermined level. This means may include a programmable level power supply.

There may also be means for incrementally sweeping the frequency of the output electrical signal, and therefore of the output ultrasonic signal, through a preselected band width, means for comparing the amplitude of the reflected sound signal and noise received for each incremental frequency and means for setting and maintaining the frequencY of the output electrical current, and of the output ultrasonic signal, at a frequency within the band width where the reflected said ultrasonic signal and received noise are at optimum levels.

The apparatus may include a microprocesser for automatically controlling the digitally controlled means The invention provides significant advantages over more conventional depth sounding apparatuses. It frees both suppliers and purchasers from the necessity of matching transducers with a particular transmitter, receiver and display unit or combined main unit. Any increased costs are offset by increased production volumes, because different units needn't be made for each transducer, and by reduced costs in stocking alternative units. Furthermore, the invention provides a unit which is more adaptable and offers better performance than pre-existing units of its type.

DESCRIPTION OF THE PREFERRED EMBODIMENTS

Figure 1:
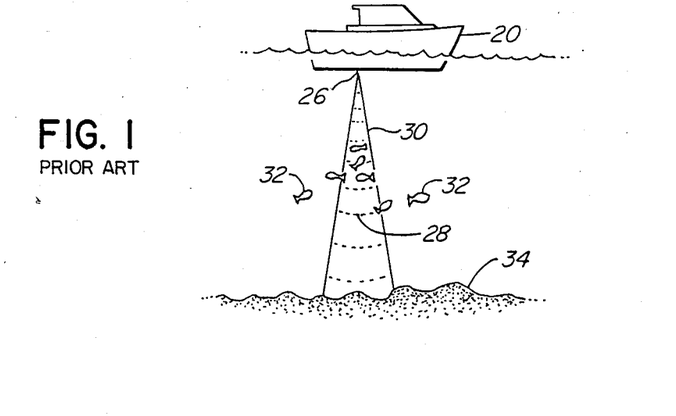
FIG. 1 is a partly diagrammatic side elevation of a boat floating in a body of water, and showing the propagation of ultrasonic waves from a depth sounder unit to the bottom and fish in the water.
Figure 2:
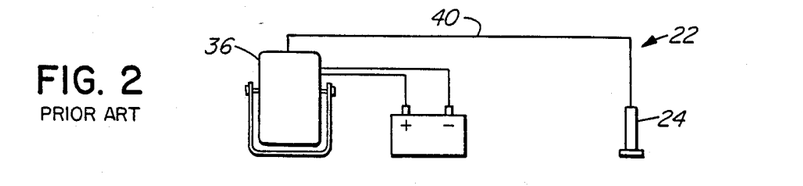
FIG. 2 is a diagrammatic elevation of a typical depth sounder apparatus.

Referring firstly to FIG. 1, this shows a boat 20 fitted with a depth sounder apparatus 22 illustrated in FIG. 2. Transducer 24 is installed through the hull of the boat 20 at a point 26 where the hull is in contact with the water. The depth sounder apparatus produces a plurality of successive ultrasonic signals 28, which are propagated through the water and form a conical pattern 30, which enlarges downwardly from point 26. The ultrasonic signals are reflected off objects such as fish 32 or bottom 34, and are reflected back towards point 26.

Figure 3:
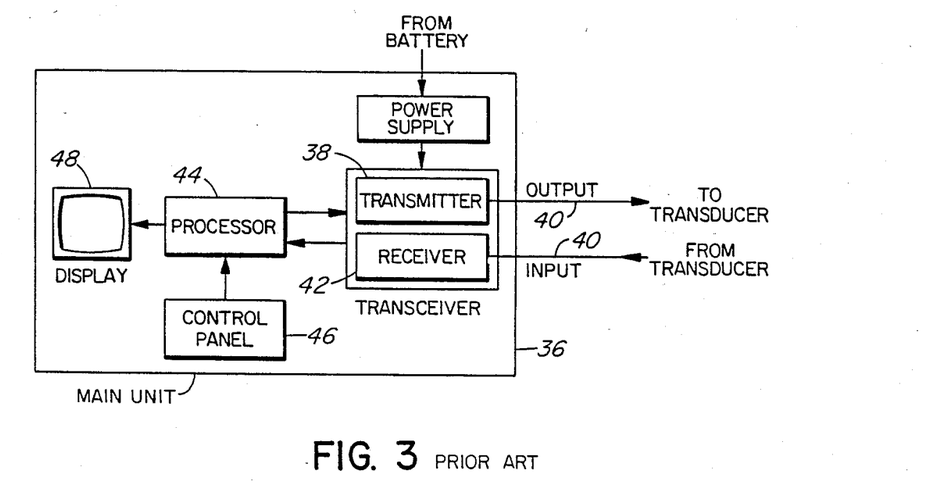
FIG. 3 is a block diagram representing the main unit of a typical depth sounder apparatus.

The ultrasonic signals originate as a high frequency electrical current produced intermittently by main unit 36 of the apparatus, and, in particular, by its transmitter portion 38, showing FIG. 3. The high frequency electrical current produced bY the main unit 36, is carried by a cable 40 to transducer 24, which converts the electrical current to ultrasonic vibrations. After this pulse of ultrasonic vibration is produced, the transmit cycle ends and the reflected ultrasonic vibrations are received back by the transducer 24, where they are converted back into an electrical current carried back to main unit 36 by cable 40. The electrical signals are filtered and amplified by receiver portion 42, and then fed into a processor 44 controlled by a control panel 46, which processes the signal to produce an image on display portion 48, which is easily interpreted by the user as representing the fish or the bottom. Typical display units have been described above and may include moving charts or, preferably in the case of this invention, a video display terminal. The transmitter portion 38, receiver portion 42, processer 44, control panel 46 and display portion 48 could be a set of separate components connected together, but more typically form a single main unit 36, as shown in FIG. 2. As described thus far, depth sounder apparatus 22 is the same as a typical prior art apparatus and would be well understood by someone in the field of art. Consequently, a more detailed description is not necessarY.

Figure 4:
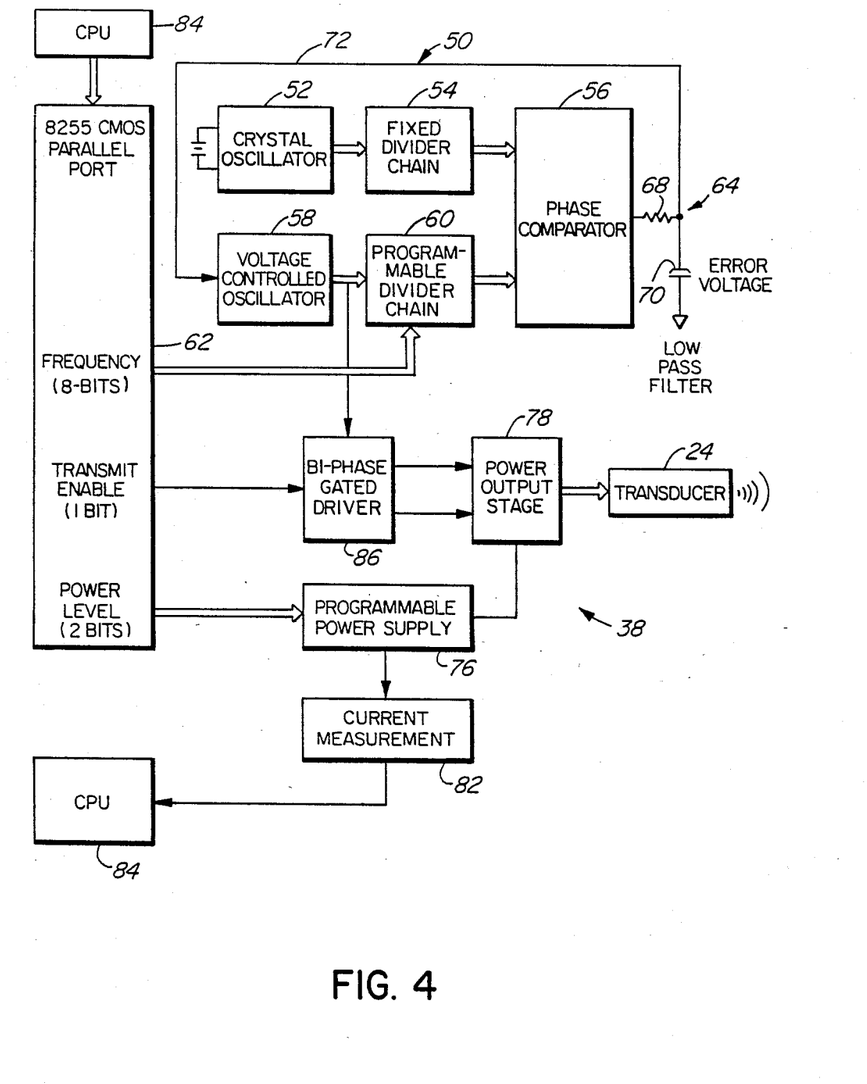
FIG. 4 is a block diagram representing the transmitter portion of a distance detecting apparatus according to an embodiment of the invention.

One aspect of the invention provides improvements to the transmitter 38, as shown in FIG. 4. The transmitter has a programmable frequency oscillator 50, the details of which are shown in FIG. 4. In order to generate all of the required frequencies to fit the available transducers, that is, from approximately 40 KHz to 220 KHz, two oscillator and digital counter chains are employed. Firstly, there is a fixed frequency, crystal controlled oscillator 52. The fixed frequency oscillator in this embodiment runs at 4.096 MHz and is stable with time, voltage and temperature to several orders better accuracy than is actuallY required. This stable frequency is divided by a divider, in this case a multi-stage CMOS binary counter 54 of a fixed ratio, so as to produce an output of 1000.00 Hz which is fed into a phase comparator 56.

There is also a voltage controlled oscillator 58 which is used to produce the desired frequency. Oscillator 58 will produce frequencies from under 1 MHz to over 4 MHz when its control input is swung from ground to positive supply. Oscillator 58 is not sufficiently stable to be used alone in this application. The current with the unstable frequency produced is fed into another multi-stage CMOS binary counter 60, the precise counting ratio of which can be set in binary steps by logical control. The ratio is set by latch 62 so as to produce a current having an unstable 1 KHz frequency which is fed into the phase comparator 56.

The phase comparator 56 produces a pulse during each duty cycle of the transmitter (when the transmitter transmits) so as to produce a pulse train dependent upon the relationship between the frequencies of the currents received from binary counters 54 and 60. This variable duty cycle pulse train is filtered by a simple low pass filter 64 including a resistor 68 and a capacitor 70 to produce a DC voltage which is dependent on the relationship between the two input signals received by the phase comparator. If the two input frequencies are identical, then the DC output is approximately half way between ground and supply. If the variable frequency is higher than the fixed frequency, the output voltage will be below this level. If the variable frequency is lower than the fixed frequency, then the output will be above this level.

The varying DC voltage produced is then fed back and used to control the voltage controlled oscillator 58 by means of a closed loop 72. The voltage thus produced after the filter 64 will eventually settle (in the order of a few tens of ms) so that the variable frequency produced by oscillator 58 produces a frequency very close to one KHz when divided by the counter ratio programmed into binary counter 60. The frequency synthesizer section shown in FIG. 4 thus produces a current with a frequency variable in steps of one KHz over the entire range of transducer frequencies.

Transmitter portion 38 also includes a programmable level power supply 76 shown in FIG. 4. This is of standard design based on a Linear Technology LT1070 switching regulator in this example. It is desirable to operate the transducer at the maximum power level within the capabilities of a particular transducer, so that the apparatus operates most effectively. A level of 600 watts is set as the power level suitable for commonly used transducers. Since impedances of transducers vary, the output voltage supplied to a particular transducer must be adjusted to assure the 600 watt output.

Accordingly, apparatus 38 is provided with another closed loop system. programmable power supply 76 supplies power to power output stage 78 of transmitter 38. The output stage 78 then generates a sine wave, high frequency electrical current to the transducer 24. The amplitude of this current is proportional to the amount of power supplied to output stage 78 by the programmable power supply 76. The power consumed by the power supply 76 is measured by means of a current measurement device 82. An analog/digital converter feeds the information to central processing unit (CPU) which, in this embodiment, is incorporated into a microprocessor 84. The programmable power supply 76 includes a digital to analog converter driven from parallel port latch 62 which is set by microprocessor 84. The programmable power supplY 76 is fed by a fixed voltage stable supply and therefore its input power is simply that voltage multiplied by the current measured by current measurement device 82. The output power of transmitter portion 80 is equal to the input power supplied to power supply 76, less losses in the transmit stage. These losses are relatively constant, so the relationship of actual power output to observed input current can be calculated by the microprocessor.

As may be observed in FIG. 4, the transmit frequency signal from voltage controlled oscillator 58 is fed to dual phase clock generator 86, which produces the opposing phase drive signals needed by power output stage 78, which is of the push-pull type. As mentioned above, the transmitter transmits impulses comprising a duty cycle wherein the transmitter transmits, followed by a pause wherein the receiver receives the signal reflected back to the transducer. The duty cycle is controlled by a transmit enable signal received from latch 62 by clock generator 86. The latch is set by the microprocessor 84. The transformer of the output stage in this embodiment is designed to offer low impedance and wide band width over the anticipated range it must cover. A TDK PQ core material is used in this example and is designed large enough for the lowest anticipated frequency involved. In this case the PQ 40/40 size is employed. Otherwise, the output stage is a conventional push-pull dual MOSFET centre tapped transformer drive. In this embodiment it is designed to be supplied by the programmable power supply 76 with 15 to 75 volts. There is a step-up output transformer which results in outputs in this example of 350 volts peak-to-peak up to 1,700 volts peak-to-peak across the transducer 24. This voltage range is sufficient to deliver 600 watts RMS for the range of impedances covering the majority of commonly used transducers.

Referring to the controls used for the transmitter in more detail, it has already been described how the programmable power supply signal, the transmit enable signal, and the signal for binary counter 60 are received from latch 62. Separate parallel port latches could be used, but for economy in this embodiment, three parallel ports are used on a single CMOS 8255 parallel port LSI chip. The microprocessor 84 is capable of setting individual bits in the latch for each purpose without disturbing adjacent bits. Eight bits are used for the frequency supplied to binary counter 60, one bit for the transmit enable signal supply to clock generator 86 and two bits are used for the power level information supplied to programmable power supply 76.

The bit devoted to the transmit enable signal is normally off or 0. When the microprocessor desires a transmit cycle, it turns this bit on, which enables gates between clock generator 86 and power output stage 78. With the gates off, the transmitter portion is shut down, producing no output.

The transmit burst is set as a fixed percentage of the transmit cycle, usually about 1 percent. For example, the transmit cycle typically has a length of about 40 milliseconds when set up to detect objects in the 100 foot range. Consequently, the transmit pulse would last about 400 micro seconds.

The transmit pulse should be relatively brief for good resolution of the image, because the thickness of the echo displayed is at least as thick as the length of the transmitted pulse. The total power consumption however, is the RMS output power of the transmitter portion times the percentage of the duty cycle. Therefore, with 600 watts RMS, only 6 watts DC are consumed. In fact, with associated losses, the total power consumption is still under 10 watts which is still acceptable even for small boats with limited electrical capacity.

Figure 5:
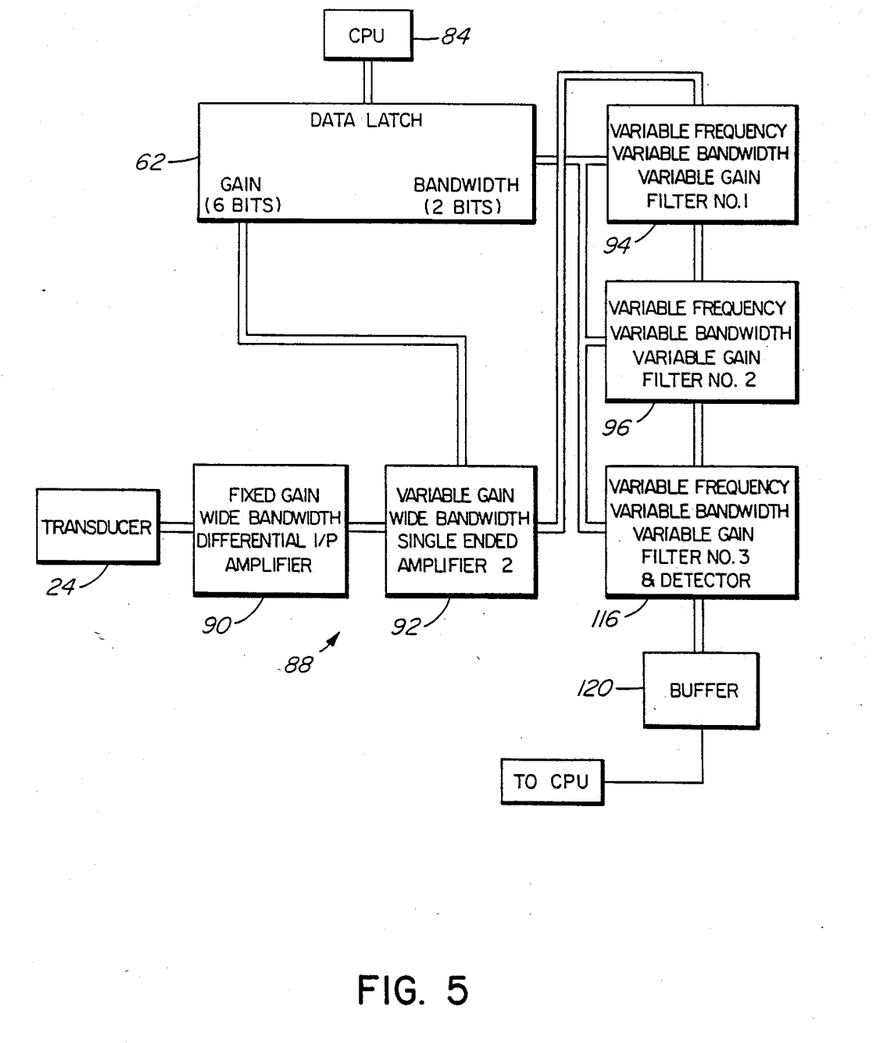
FIG. 5 is a block diagram representing the receiver portion of a distance detecting apparatus according to an embodiment of the invention.

In addition to the data bits discussed above, the latch 62 also devotes eight bits for information supplied to receiver portion 88 shown in FIG. 5. Six bits are used to control the gain of the receiver, while two bits are used to control its band width. Again, the bits are set by microprocessor 84.

The transducers used, such as transducer 24 shown in FIG. 2, are a balanced two-wire plus ground type. The same two leads are used for both the transmit and receive signals. Accordingly, there are hundreds of volts peak-to-peak across the same two leads during the transmit phase, and seconds later, possibly only microvolts of echo are sent back to the receiver. For this reason, the front end of the receiver must be protected carefully against overload and must have fast recovery from overload, as well as common mode noise rejection. The overload protection is accomplished in this preferred embodiment by fast acting diode clamps across the differential input. This is the standard approach used by most manufacturers of ultrasonic depth sounders. Stable gain, fast recovery and high common mode rejection are accomplished by the use of, for example, a BIFET operational amplifier available from National Semiconductor as the LF353 Wide Bandwidth Dual JFET input operational amplifier, or the equivalent available from other manufacturers.

The voltage gain of the front end of the receiver varies slightly with the impedance of the transducer, but is typically 47dB with a completely flat bandwidth from 20 KHz to 300 KHz which covers all conceivable transducers.

The second stage 92 employs the same LF353 integrated circuit as does the first stage 90. However, this one is of a single ended design and has a gain variable from −15 dB to +20 dB. The gain is changed in sixty-four fairly equal steps by switching in combinations of input resistors in the integrated circuits feedback loop. The resistor switching is done in this case by commonly available CMOS FET switch packages such as the 4066 type. The desired combination is set in the latch 62 by the microprocessor 84. This gain setting may be set manually by a gain control on a control panel of the apparatus, or may be set automatically by the microprocessor for maximum signal without clipping when under automatic gain control. In either case, the band width is again flat for all conceivable transducer frequencies.

In this final stage of flat frequency response, a fixed 20 dB gain is employed to bring typical echo signals up to nearly clipping levels, that is, up to 10V peak-to-peak. The overall system response is configured so that a signal that just clips at maximum gain is achieved from an echo of a bottom at a depth claimed for that version of sounder and transducer combination. This might typically be 700 feet in salt water over a flat rocky bottom at a 120 Khz with 100 watts RMS of transmit power.

Up to this stage, that is, after second amplifier stage 92, no signal processing has occurred other than common mode rejection in the first amplifier stage 90 as mentioned above. The signal is as high in amplitude as possible, given the available power supply level and has a wide band width when compared with conventional units. The receiver portion 88 has provision for filtering unwanted noise from this signal. The amount of noise varies considerably. With little boat motion, there may be very little noise to produce a visible image on the video display. In that case, little processing is required. As boat speed increases, however, turbulence induced noise ,levels rise until the wanted signal is completely buried in noise.

Noise can be reduced by narrowing the band width, but this results in a loss of resolution of the image. Consequently wider band widths should be used when there is less noise to maximize detail and narrower band widths when there is a great deal of noise. In addition, to take full advantage of filtering by reducing the band width, the receiver must be tuned very accurately to the transducer frequency.

Since conventional tuned circuits are not capable of such accurate tuning of the receiver, they must employ a wider band width to assure that the signal is not lost entirely. This embodiment of the invention, by comparison, employs a switched capacitor filter network for tuning the receiver very accurately. First filter stage 94 and second filter stage 96 shown in FIG. 5 are the same, and thus both may be understood with reference to FIG. 6 which shows the first filter stage 94.

Figure 6:
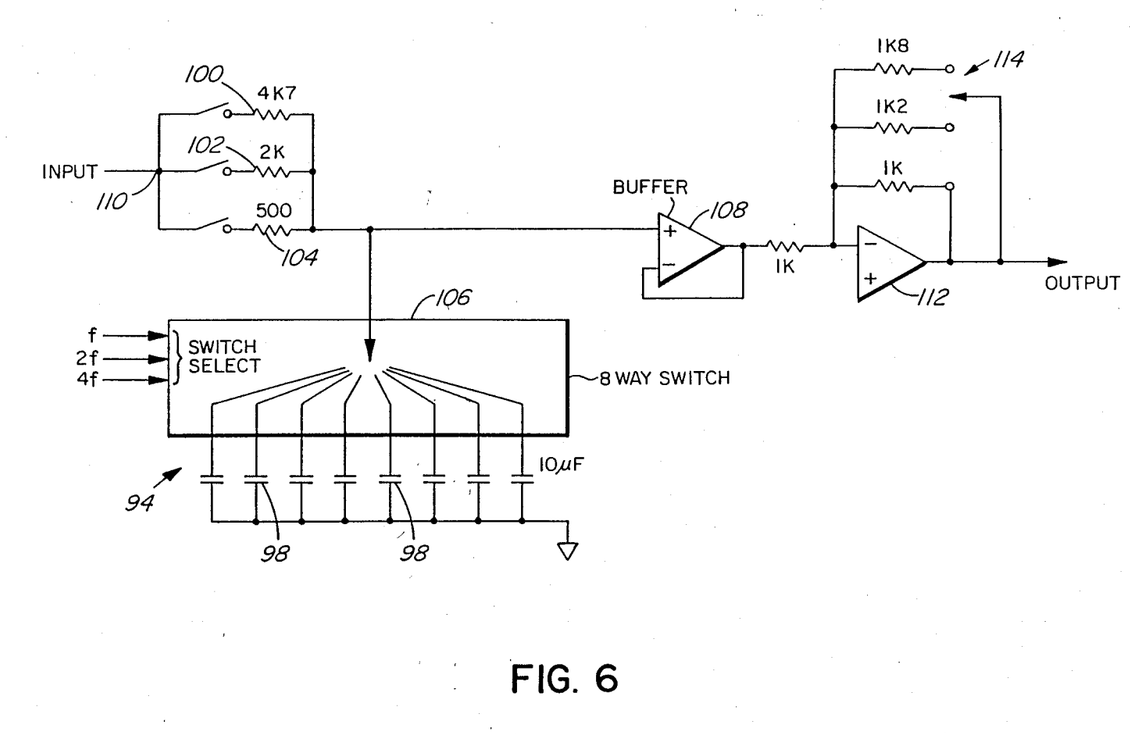
FIG. 6 is a schematic diagram showing a filter stage typical of the first two filters of FIG. 5.

In general terms, switched capacitor filters employ resistors and capacitors in series. For example, if the RC time constant is 0.01 second, then the signal passing through the filter falls to 70 percent of its peak possible signal with the same period, that is, 100 Hz. The band therefore is set purely by the values of the resistor and the capacitor and is totally independent of the centre frequency used. That frequency is set by the rate at which samples are taken from the resistor/capacitor combinations. Referring to FIG. 6, eight equal size capacitors 98 are employed, and are sequentially placed in series with one of three resistors 100, 102 and 104 by a switch 106. Here an 8 way CMOS FET switch is used. The band width is determined by which of the resistors 100, 102 and 104 is employed. The centre frequency is determined by the rate at which the switch 106 moves from one capacitor to the other. In moving from one capacitor to the other, the filter provides a wave form which approximates the original sinusoidal input. A greater number of capacitors would produce a wave form closer to an actual sinusoidal curve, but eight capacitors are found to be sufficient for the invention. Switch 106 moves with exactly the same frequency as the transmit frequency, and herefore produces a filtered signal having exactly the same centre frequency as the transmit frequency. The output is fed through a FET buffer 108 which is a high impedance buffer to reduce the discharge of capacitors 98 when the capacitors are sampled by switch 106.

Three band widths are used in the present invention. One of the three resistors 100, 102 or 104 is selected by switch 110 which is a CMOS 4066 FET switch in this embodiment. The microprocessor determines the position of the switch, which position is held in latch 62 shown in FIG. 5.

When the band width is changed, by selecting the particular resistor 100, 102 or 104, the amplitude of the filtered signal correspondingly changes. The narrower the band width, the smaller the amplitude of the signal. To compensate for this, each filter stage has an amplifier 112 which switches in additional gain as band width is reduced, so that the output signal is approximately constant irrespective of band width. The gain is controlled by a switch 114, again controlled by the microprocessor and the latch.

Figure 7:
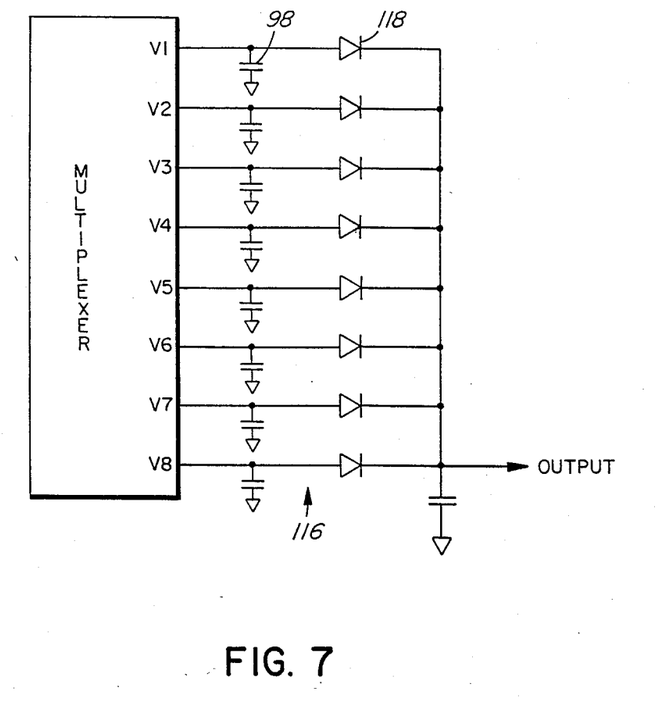
FIG. 7 is a schematic diagram of the third filter and detector of FIG. 5.

Third filter stage 116 is similar to stages 94 and 96. However, as seen in FIG. 7, it also includes a multiple detector stage with a separate diode 118 across each of the eight filter capacitors 98, which have been given the same number as in the previous filter stages. The detected output therefore corresponds to the maximum voltage across any of the eight capacitors. This is necessary because of the presence of switching spikes that are inherent in switched capacitor filters, and are more significant with the high frequencies used in this case. The spikes are developed across the on resistance of the FET's used as capacitor switches. They are not present in the same magnitude across the capacitors themselves. The diodes ensure that the detected signal at any moment is the peak value of the eight possible signals.

Referring back to FIG. 5, the filtered signal is then buffered by a buffer 120 and is then sent to the microprocessor in an eight-bit digital format by means of a medium speed flash converter such as analog devices AD7576 or the equivalent. The microprocessor measures the time between an output pulse and the corresponding reflected pulse and produces a signal to the display unit 44 which converts the signal to a readable form indicating depth. The sampling rate depends upon the depth being scanned. The user enters the depth to be scanned via a control on the control panel. This information is received by the microprocessor which determines the scan rate. Approximately 200 samples are needed to fill the screen display from the displayed "surface" to the displayed "bottom". For example, if the maximum depth is 100 ft., with sound travelling in water at approximately 5,000 ft. per second, the 200 samples would need to be taken 100 micro seconds apart. The analog to digital converter used in this embodiment allows a maximum sampling rate of one conversion every 10 micro seconds, which allows resolution down to 1 inch or 2.5 cm.

Automatic control of the transmitter and receiver is not essential, they could be controlled manually. However, a microprocessor is employed to handle the CRT display and thus conveniently may be used to examine the transducer and optimize the frequency of the transmitter portion, set the frequency of the receiver portion and optimize the band width, power and gain for the particular transducer and set of circumstances. This makes it much simpler for the user.

The apparatus can be set up initially by testing the unit in a specified condition, typically in about 100' of water over a flat bottom. The microprocessor then issues commands to sweep the entire frequency band, and store all of the received signals in its memory. The lowest frequency is first selected, the transmitter pulsed and the received signals stored. The frequency is then raised 1 KHz at a time and the process repeated until the highest frequency is reached. At the end of this sweep the microprocessor compares the amplitudes of signal and noise received for each frequency and presents suggestions for frequencies to use. This may be done by displaying on the sounder screen a graph of response against frequency. Usually there is a clear peak response at one frequency. There is, however, sometimes more than one clear choice, because a good response may be received at more than one frequency. This is especially true with the cheaper transducers or those designed to operate at more than one frequency. In such cases, the peaks are unlikely to be at the same amplitude, but the user may choose a frequency producing less than the one producing the maximum peak. It may, for example, give the best extreme depth performance. Both signal and noise must be measured because there are modes of crystal operation that result in extensive transducer ringing at the same time as reasonable echo response, and these modes should be avoided because of the confusing screen clutter they may cause.

The tests are repeated several times to build up an average because the boat may have moved and the bottom changed during the scan. However, the sweep is limited to one minute to reduce the effects of boat motion.

Without a microprocessor, the user would manually adjust the frequency, and then keep a written record of the results for later comparison. It should be understood that many of the details described above are by way of example only and can be varied by someone skilled in the art within the scope of the invention which is defined with reference to the following claims:

It will be understood that many of the details described above are by way of example only and can be changed by someone skilled in the art within the scope of the invention as set forth in the following claims.

What is claimed is:

1. A distance detecting apparatus, comprising:
   first means for producing a cyclic output pulse;
   second means operatively connected to the first means for setting the output pulse at a first frequency.and means for connecting the apparatus to a transducer to convert the output pulse to an ultrasonic signal, the first frequency being any of a plurality of transmit frequencies in a bandwidth of frequencies, said transmit frequencies being separated by increments of frequency which are small relative to the bandwidth, thereby allowing the transmit frequency to be tuned for transducers of different resonant frequencies;
   third means for receiving a return pulse and having an adjustable centre frequency of response;
   fourth means operatively connected to the third means for adjusting the centre frequency of response of the third means, so said centre frequency of response is the same as said first frequency; and fifth means operatively connected to the first means and the third means for measuring time between an output pulse and a return pulse and thereby a distance.

2. An apparatus as claimed in claim 1 wherein the second means includes a programmable frequency oscillator.

3. An apparatus as claimed in claim 1, wherein the programmable frequency oscillator includes a fixed frequency oscillator, a controllable frequency oscillator, a programmable divider connected to the voltage controlled oscillator and a phase comparator connected to the fixed frequency oscillator and to the programmable divider, the phase comparator being connected to the controllable oscillator to stabilize the frequency of the controllable oscillator.

4. A distance detecting apparatus comprising transmitter means for producing a cyclic output signal, and a transducer means operatively connected to the transmitter means for converting the output signal to an ultrasonic signal, the transmitter means having an output stage and digitally controlled means for adjusting power supply voltage for the output stage and thereby power output of the transmitter to match power output of the transmitter with maximum power input of the transducer, the apparatus further including means for measuring the current of the power supply for the output stage, the means for adjusting the power supply voltage being responsive to the current of the power supply so that the power supply for the output stage and thereby the power of the output signal are at predetermined levels.

5. An apparatus as claimed in claim 4 wherein the means for adjusting includes a programmable power supply.

6. An apparatus as claimed in claim 5, wherein the programmable power supply includes a digital to analog converter connected to the output stage, a latch connected to the digital to analog converter to drive the digital to analog converter, a microprocessor connected to the latch for setting the latch, means for measuring current fed to the programmable power supply, and means for communicating said current measurement to the microprocessor.

7. An apparatus as claimed in claim 4, further including a microprocessor for digitally controlling the second means.

8. A depth sounding apparatus for transmitting an ultrasonic pulse and for receiving back a reflected pulse to indicate the depth of an object, the apparatus having a receiver with an adjustable frequency response extending over a band of frequencies, and means for adjusting the width of said band of frequencies, said means including a switched capacitor filter, and means for setting a centre frequency of response, wherein said means for adjusting the width of said band of frequencies is capable of increasing the bandwidth for a given centre of frequency of response when noise levels are low relative to the reflected pulse and of decreasing the bandwidth when noise levels are high, relative to the reflected pulse.

9. An apparatus as claimed in claim 8, including a plurality of filter stages in the receiver, each having a switched capacitor filter.

10. An apparatus as claimed in claim 9, wherein each said filter stage has a plurality of capacitors, a final said filter stage having a diode connected in series with each said capacitor.

11. An apparatus as claimed in claim 8, further including a microprocessor connected to the receiver for digitally controlling said means for adjusting the width of said band of frequencies.

12. A distance detecting apparatus including:

a transmitter for producing periodic cyclic output electrical signals;

a transducer operatively connected to the transmitter for converting the output signals to output ultrasonic pulses, for receiving periodic reflected ultrasonic pulses and for converting the reflected pulses to periodic input electrical signals, each said input signal corresponding to one of the output signals;

a receiver operatively connected to the transducer for receiving the input electric signal, the receiver having a centre response frequency;

digitally controlled means operatively connected to the receiver for adjusting the centre response frequency to correspond to the frequency of the output electrical signals;

means operatively connected to the receiver for measuring time between each periodic output signal and a corresponding said periodic input signal, and for converting said time to a readable form indicating a distance at which the ultrasonic pulse is reflected; and digitally controlled means operatively connected to the transmitter for adjusting the frequency of the output electrical signal in relatively small increments to a desired level within a band of frequencies generally between 40 kHz and 240 kHz.

13. An apparatus as claimed in claim 12, wherein the digitally controlled means for adjusting the centre response frequency includes a switched capacitor filter.

14. An apparatus as claimed in claim 12, wherein the programmable frequency oscillator includes a fixed frequency oscillator, a controllable frequency oscillator, a programmable divider connected to the controllable oscillator and a phase comparator connected to the fixed frequency oscillator and to the programmable divider, the phase comparator being connected to the controllable oscillator to stabilize the frequency of the controllable oscillator.

15. A distance detecting apparatus including:

a transmitter for producing periodic cyclic output electrical signals;

a transducer operatively connected to the transmitter for converting the output signals to output ultrasonic pulses, for receiving periodic reflected ultrasonic pulses and for converting the reflected pulses to periodic input electrical signals, each said input signal corresponding to one of the output signals;

a receiver operatively connected to the transducer for receiving the input electrical signals;

means operatively connected to the receiver for measuring time between each periodic output signal and a corresponding said periodic input signal, and for converting said time to a readable form indicating a distance at which the ultrasonic pulse is reflected; and digitally controlled means operatively connected to the transmitter for adjusting the frequency of the output electrical signals in relatively small increments to a desired level within a band of frequencies generally between 40 kHz and 240 kHz, the digitally controlled means including a programmable frequency oscillator.

16. A distance detecting apparatus including:
a transmitter for producing periodic cyclic output electrical signals, said transmitter having an output stage;
a transducer operatively connected to the transmitter for converting the output signals to output ultrasonic pulses, for receiving periodic reflected ultrasonic pulses and for converting the reflected pulses to periodic input electrical signals, each said input signal corresponding to one of the output signals;
a receiver operatively connected to the transducer for receiving the input electrical signals;
means operatively connected to the receiver for measuring time between each periodic output signal and a corresponding said periodic input signal, and for converting said time to a readable form indicating a distance at which the ultrasonic pulse is reflected;
digitally controlled means connected to the transmitter for adjusting power level of the output electrical signals to a safe maximum level for the transducer, the means for adjusting the power level including a programmable power supply including a digital to analog converter connected to the output stage, a latch connected to the digital to analog converter to drive the digital to analog converter, a microprocessor connected to the latch for setting the latch, means for measuring current fed to the programmable power supply and means for communicating said current measurement to the microprocessor.

17. A distance detecting apparatus including:
a transmitter for producing periodic cyclic output electrical signals;
a transducer operatively connected to the transmitter for converting the output signals to output ultrasonic pulses, for receiving periodic reflected ultrasonic pulses and for converting the reflected pulses to periodic input electrical signals, each said input signal corresponding to one of the output signals;
a receiver operatively connected to the transducer for receiving the input electrical signals;
means operatively connected to the receiver for measuring time between each periodic output signal and a corresponding said periodic input signal, and for converting said time to a readable form indicating a distance at which the ultrasonic pulse is reflected; and
digitally controlled means operatively connected to the transmitter for adjusting the frequency of the output electrical signals in relatively small increments to a desired level within a band of frequencies generally between 40 kHz and 240 kHz, the digitally controlled means including means for incrementally increasing the frequency of the output electrical signals and of the output ultrasonic pulses through a preselected bandwidth, means for comparing amplitudes of reflected said ultrasonic pulses for each incremental frequency and means for setting and maintaining the frequency of the output electrical signals and of the output ultrasonic pulses at a frequency within the bandwidth where the reflected ultrasonic signals and the received noise are at optimum levels.

18. An apparatus as claimed in claim 17, wherein the means for incrementally increasing includes a microprocessor.

19. An apparatus as claimed in claim 17, wherein the means for setting and maintaining includes a latch.

20. A distance detecting apparatus including:
a transmitter for producing periodic cyclic output electrical signals;
a transducer operatively connected to the transmitter for converting the output signals to output ultrasonic pulses, for receiving periodic reflected ultrasonic pulses and for converting the reflected pulses to periodic input electrical signals, each said input signal corresponding to one of the output signals;
a receiver operatively connected to the transducer for receiving the input electrical signals, the receiver having a frequency of response extending over a band of frequencies and means for adjusting the bandwidth of said band of frequencies;
means operatively connected to the receiver for measuring time between each periodic output signal and a corresponding said periodic input signal, and for converting said time to a readable form indicating a distance at which the ultrasonic pulse is reflected; and
digitally controlled means operatively connected to the transmitter for adjusting the frequency of the output electrical signals in relatively small increments to a desired level within a band of frequencies generally between 40 kHz and 240 kHz.

21. An apparatus as claimed in claim 20, wherein said means for adjusting the bandwidth includes a switched capacitor filter.

22. An apparatus as claimed in claim 21, further including means for digitally controlling the switch capacitor filter.

23. An apparatus as claimed in claim 8, further comprising means for setting the bandwidth independently of the centre frequency of response.

24. An apparatus as claimed in claim 23, further including a microprocessor connected to the receiver for digitally controlling said means for setting the bandwidth independently of the centre frequency of response.

* * * * *